US012603426B2

(12) United States Patent
Chang et al.

(10) Patent No.: US 12,603,426 B2
(45) Date of Patent: Apr. 14, 2026

(54) INTEGRATED ANTENNA STRUCTURE

(71) Applicant: CHILISIN ELECTRONICS CORP., Hsinchu County (TW)

(72) Inventors: Sheng-Che Chang, Taoyuan City (TW); Heng-Ming Lee, Taoyuan City (TW); Hsien-Yu Chiu, Taoyuan City (TW); Shao-Fu Lo, Taoyuan City (TW)

(73) Assignee: CHILISIN ELECTRONICS CORP., Hsinchu County (TW)

(*) Notice: Subject to any disclaimer, the term of this patent is extended or adjusted under 35 U.S.C. 154(b) by 426 days.

(21) Appl. No.: 18/129,937

(22) Filed: Apr. 3, 2023

(65) Prior Publication Data

US 2024/0204397 A1 Jun. 20, 2024

(30) Foreign Application Priority Data

Dec. 20, 2022 (TW) .................................. 111148827

(51) Int. Cl.

| | |
|---|---|
| ***H01Q 5/307*** | (2015.01) |
| ***H01Q 1/48*** | (2006.01) |
| ***H01Q 1/52*** | (2006.01) |
| ***H01Q 9/04*** | (2006.01) |
| ***H01Q 21/28*** | (2006.01) |

(52) U.S. Cl.

CPC ............... *H01Q 1/521* (2013.01); *H01Q 1/48* (2013.01); *H01Q 5/307* (2015.01); *H01Q 9/0407* (2013.01); *H01Q 21/28* (2013.01)

(58) Field of Classification Search

CPC ......................... H01Q 1/52–526; H01Q 1/525
See application file for complete search history.

(56) References Cited

U.S. PATENT DOCUMENTS

| | | | | | |
|---|---|---|---|---|---|
| 2013/0093641 | A1* | 4/2013 | Ng | H01Q 21/28 | 343/841 |
| 2013/0229318 | A1* | 9/2013 | Ng | H01Q 5/30 | 343/770 |
| 2016/0049736 | A1* | 2/2016 | Liu | H01Q 21/28 | 343/893 |
| 2016/0172750 | A1* | 6/2016 | Ng | H01Q 9/0421 | 343/841 |

FOREIGN PATENT DOCUMENTS

| | | | | |
|---|---|---|---|---|
| CN | 114256601 A | | 3/2022 | |
| CN | 112490675 B | * | 1/2025 | H01Q 21/00 |
| TW | 202213866 A | | 4/2022 | |

* cited by examiner

*Primary Examiner* — Ab Salam Alkassim, Jr.
*Assistant Examiner* — David Andrew Kubera
(74) *Attorney, Agent, or Firm* — Li & Cai Intellectual Property (USA) Office

(57) ABSTRACT

An integrated antenna structure includes a grounding element, a plurality of antenna elements, and a plurality of isolators. The grounding element has an opening. The antenna elements and the isolators are disposed at an outer edge of the grounding element and an edge of the opening. The isolators are located between the antenna elements. Orthogonal projections of the antenna elements and the isolators completely overlap with the grounding element.

14 Claims, 12 Drawing Sheets

INTEGRATED ANTENNA STRUCTURE

CROSS-REFERENCE TO RELATED PATENT APPLICATION

This application claims the benefit of priority to Taiwan Patent Application No. 111148827, filed on Dec. 20, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an integrated antenna structure, and more particularly to an integrated antenna structure having a plurality of isolators.

BACKGROUND OF THE DISCLOSURE

A multiple input multiple output (MIMO) system transmits signals of different frequency bands through a multi-antenna structure serving as a transmitter, and receives signals of different frequency bands through a multi-antenna structure serving as a receiver. The multi-antenna structure generally includes multiple independent antennas. However, the cost of designing multiple independent antennas is too high to be cost effective.

Conventionally, the multi-antenna structure may also be implemented by using an integrated multi-antenna structure, but the integrated multi-antenna structure occupies a larger space in an electronic device. Since the integrated multi-antenna structure is limited by the internal space of the electronic device, distances between the multiple antennas are not large enough, such that isolations between the multiple antennas are poor, and the multiple antennas often interfere with each other while transmitting or receiving various signals.

Therefore, how to improve designs of the multi-antenna structure to overcome the above-mentioned issue has become an important issue in the art.

SUMMARY OF THE DISCLOSURE

In response to the above-referenced technical inadequacy, the present disclosure provides an integrated antenna structure to address an issue of the multi-antenna structure having poor isolations due to the limitation of the space inside an electronic device.

In one aspect, the present disclosure provides an integrated antenna structure. The integrated antenna structure includes a grounding element, a plurality of antenna elements, and a plurality of isolators. The grounding element has an opening. The plurality of antenna elements are disposed at an outer edge of the grounding element and an edge of the opening. The plurality of isolators are disposed at the outer edge of the grounding element and the edge of the opening. The plurality of isolators are located between the plurality of antenna elements. Orthogonal projections of the plurality of antenna elements and the plurality of isolators on the grounding element completely overlap with the grounding element.

Therefore, in the integrated antenna structure provided by the present disclosure, by virtue of "the plurality of antenna elements being disposed at an outer edge of the grounding element and an edge of the opening, and the plurality of isolators being located between the plurality of antenna elements," isolations between the multiple antennas in the integrated antenna structure can be effectively improved in the low frequency and high frequency bands, and characteristics of good radiation and miniaturization of the integrated antenna structure can be maintained.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
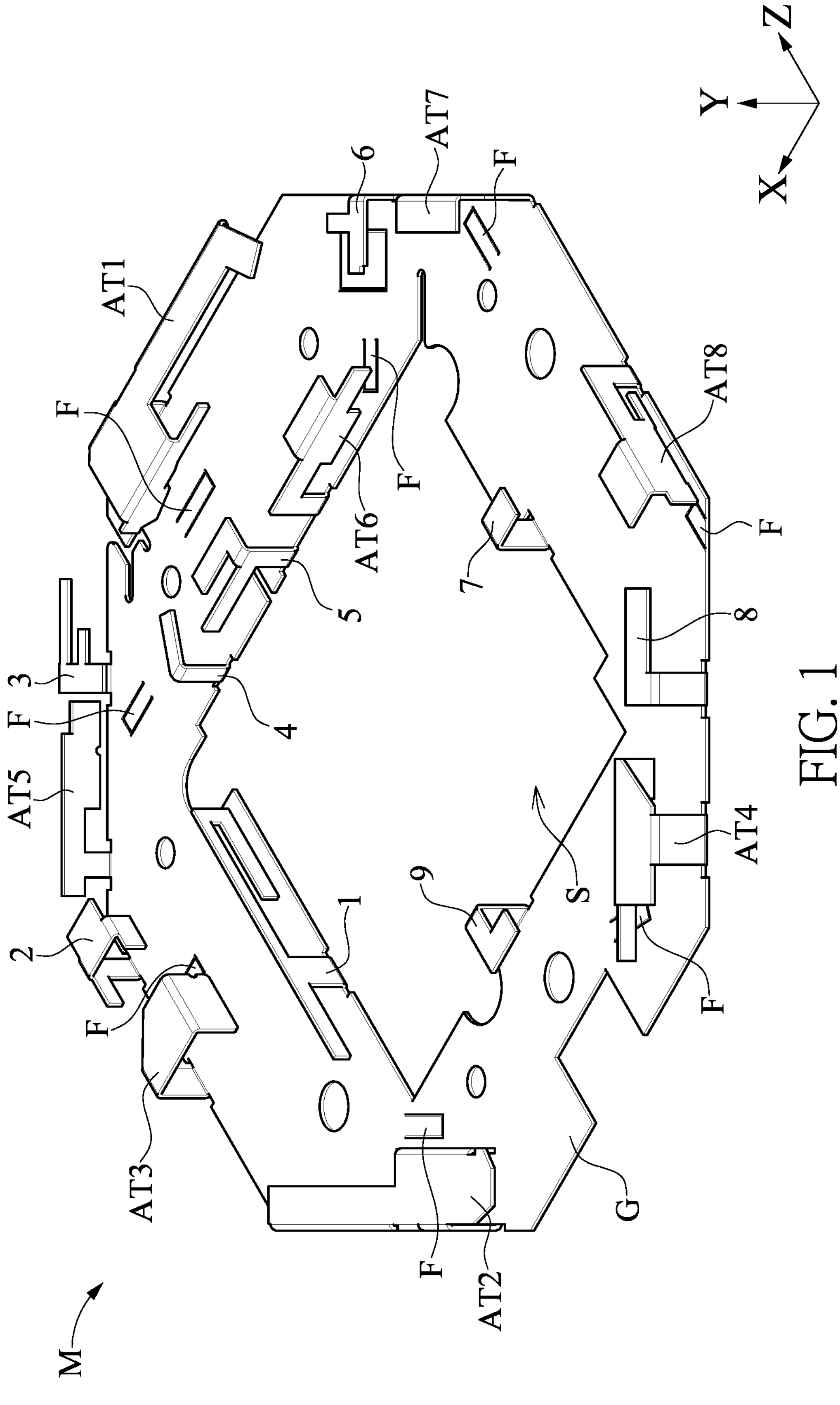
FIG. 1 is a schematic perspective view of an integrated antenna structure of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a,” “an” and “the” includes plural reference, and the meaning of “in” includes “in” and “on.” Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first,” “second” or “third” can be used to describe various components, signals or the like, which are for distinguishing one component/signal from another one only, and are not intended to, nor should be construed to impose any substantive limitations on the components, signals or the like.

Embodiment

Figure 2:
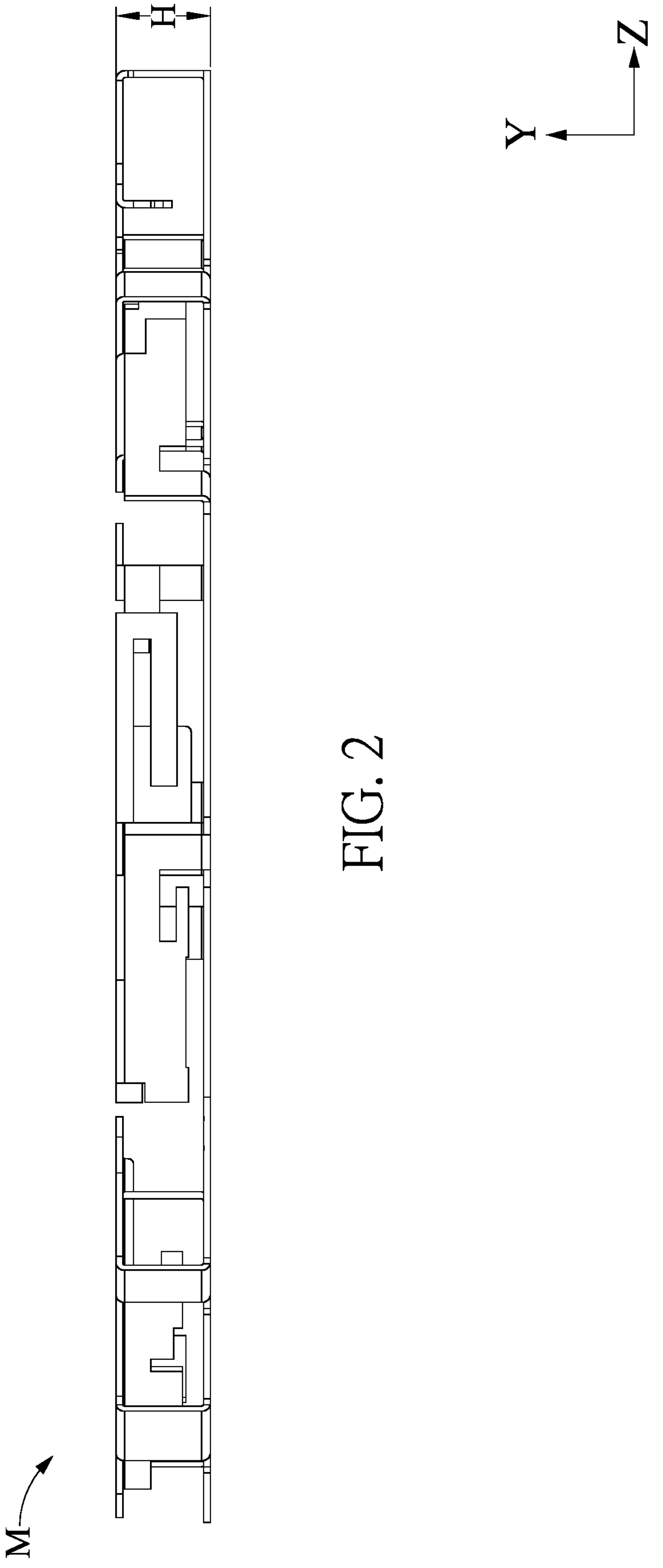
FIG. 2 is a schematic side view of the integrated antenna structure according to the present disclosure.
Figure 3:
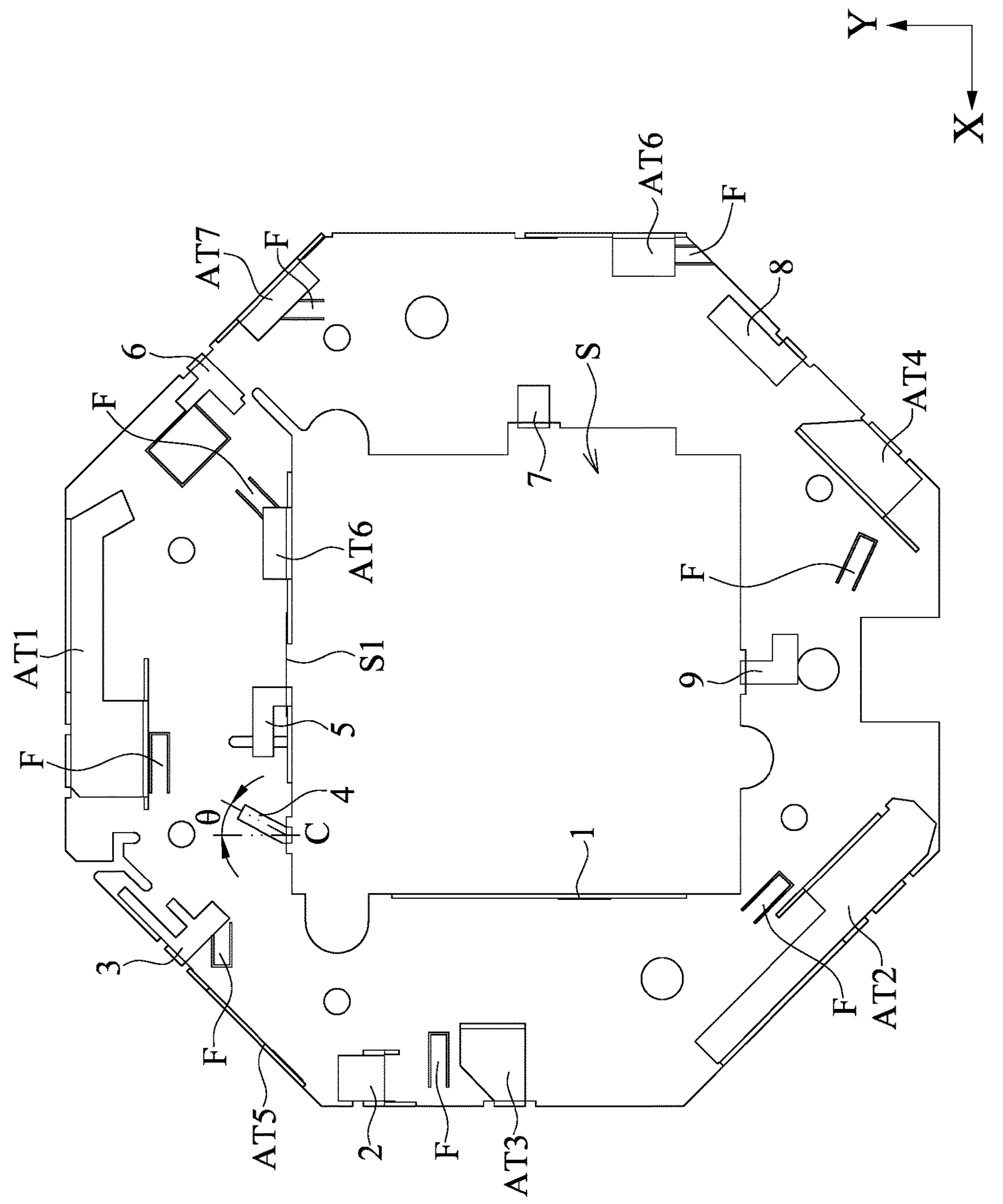
FIG. 3 is a schematic top view of the integrated antenna structure according to the present disclosure.

Referring to FIG. 1 to FIG. 3, FIG. 1 is a schematic perspective view of an integrated antenna structure of the present disclosure, FIG. 2 is a schematic side view of the integrated antenna structure according to the present disclosure, and FIG. 3 is a schematic top view of the integrated antenna structure according to the present disclosure. The present disclosure provides an integrated antenna structure M that is manufactured by stamping a metal plate. The integrated antenna structure M includes a grounding element G, a plurality of antenna elements AT1 to AT8, and a plurality of isolators 1 to 9. The grounding element G has an opening S. It should be noted that the configuration and the size of the opening S can be adjusted according to a mechanical component in which the integrated antenna structure M is installed at, and the present disclosure is not limited thereto.

In one embodiment of the present disclosure, the plurality of antenna elements and isolators have irregular shapes. As shown in FIG. 2, a height H of the integrated antenna structure M is smaller than or equal to 5.4 mm. The plurality of antenna elements and the plurality of isolators are disposed at an outer edge of the grounding element G and an edge of the opening S. The plurality of isolators are located between the plurality of antenna elements. The plurality of antenna elements and the plurality of isolators are connected to the grounding element G. Any of the isolators and any of the antenna elements are not in contact with each other. As shown in FIG. 3, orthogonal projections of the plurality of antenna elements and the plurality of isolators on the grounding element G completely overlap with the grounding element G.

The plurality of antenna elements includes a first antenna element AT1, a second antenna element AT2, a third antenna element AT3, a fourth antenna element AT4, a fifth antenna element AT5, a sixth antenna element AT6, a seventh antenna element AT7, and an eighth antenna element AT8. A plurality of feeding portions F are respectively disposed adjacent to the plurality of antenna elements. Each antenna element is electrically connected to a coaxial cable (not shown in the figures) through a corresponding one of the feeding portions F for signals to be fed into each antenna element.

For example, the first antenna element AT1 and the second antenna element AT2 are configured for generating frequency bands ranging from 2.4 GHz to 2.5 GHz and from 5.15 GHz to 5.85 GHZ, the third antenna element AT3 and the fourth antenna element AT4 are configured for generating a frequency band ranging from 5.15 GHz to 5.85 GHZ, and the fifth antenna element AT5, the sixth antenna element AT6, the seventh antenna element AT7, and the eighth antenna element AT8 are configured for generating a frequency band ranging from 5.925 GHz to 7.125 GHz. However, the aforementioned details are disclosed for exemplary purposes only, and are not meant to limit the scope of the present disclosure.

The plurality of isolators include a first isolator 1, a second isolator 2, a third isolator 3, a fourth isolator 4, a fifth isolator 5, a sixth isolator 6, a seventh isolator 7, an eighth isolator 8, and a ninth isolator 9. Each isolator is located between two of the antenna elements to produce an effective isolation, thereby preventing interference during the operation of the two antenna elements in overlapping frequency ranges.

Specifically, the first isolator 1 is located between the first antenna element AT1 and the second antenna element AT2. The second isolator 2 is located between the third antenna element AT3 and the fifth antenna element AT5. The third isolator 3, the fourth isolator 4, and the fifth isolator 5 are located between the first antenna element AT1, the third antenna element AT3, the fifth antenna element AT5, and the sixth antenna element AT6. The sixth isolator 6 is located between the sixth antenna element AT6 and the seventh antenna element AT7. The seventh isolator 7 is located between the seventh antenna element AT7 and the eighth antenna element AT8. The eighth isolator 8 is located between the fourth antenna element AT4 and the eighth antenna element AT8. The ninth isolator 9 is located between the second antenna element AT2 and the fourth antenna element AT4.

Figure 4:
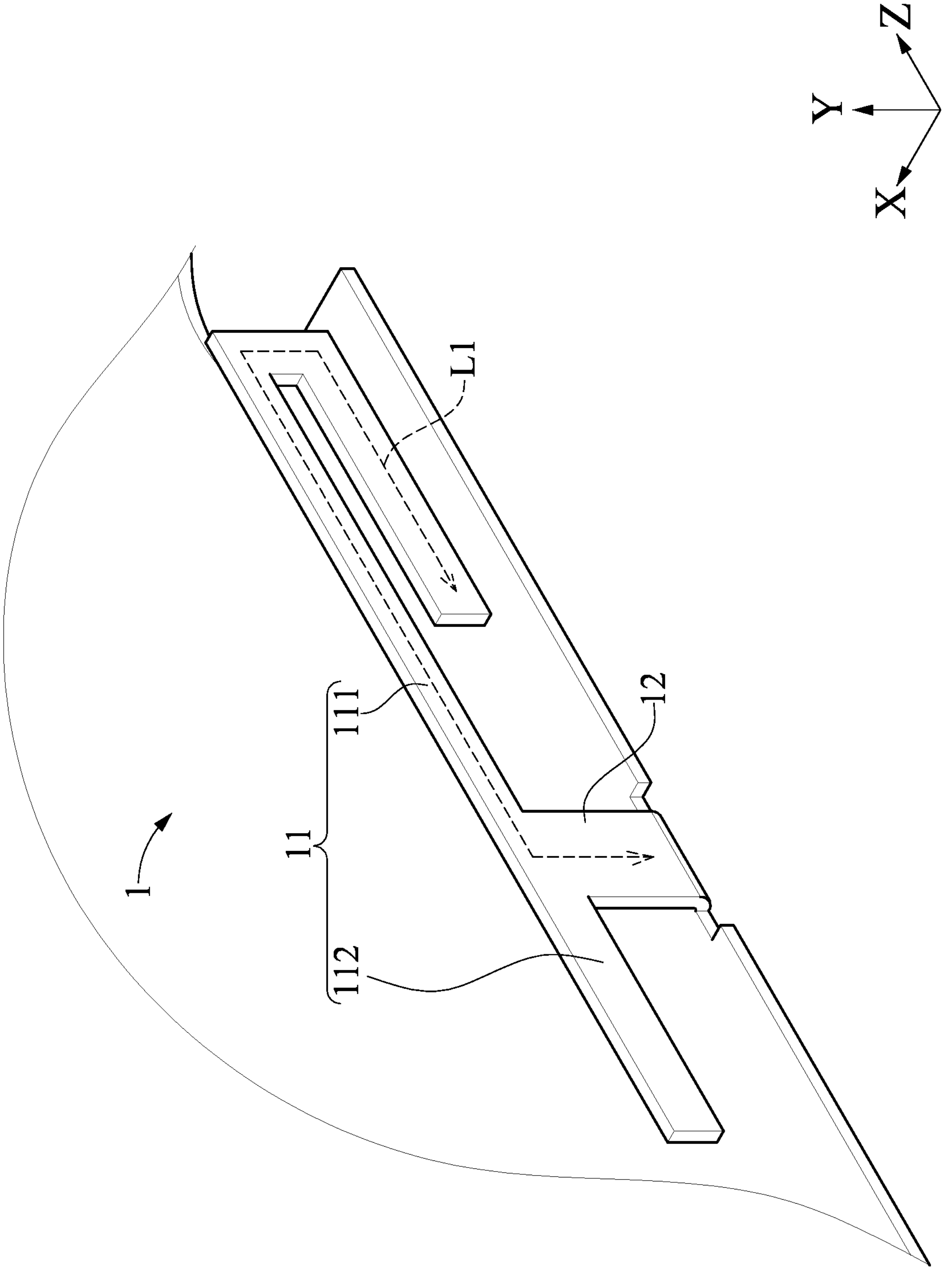
FIG. 4 is a schematic view of a first isolator of the integrated antenna structure according to the present disclosure.

Referring to FIG. 1 and FIG. 4, FIG. 4 is a schematic view of a first isolator of the integrated antenna structure according to the present disclosure. The first isolator 1 includes a first extension portion 11 and a first grounding portion 12. The first extension portion 11 includes a first branch 111 and a second branch 112. One end of the first grounding portion 12 is connected between the first branch 111 and the second branch 112, and another end of the first grounding portion 12 is connected to the grounding element G. The first branch 111 forms a curved shape, and a length of the first branch 111 is greater than a length of the second branch 112. Furthermore, a sum of the length of the first branch 111 and a length of the first grounding portion 12 is equal to one-fourth of a wavelength of 2.4 GHz. Accordingly, the first isolator 1 can be configured for adjusting impedance matching and coupling between the first antenna element AT1 and the second antenna element AT2 through the structural configuration of the first branch 111 and the second branch 112 and design in lengths of the first branch 111 and the first grounding portion 12, and the isolation between the first antenna element AT1 and the second antenna element AT2 can be improved in an operating frequency band of 2.4 GHz.

Figure 5:
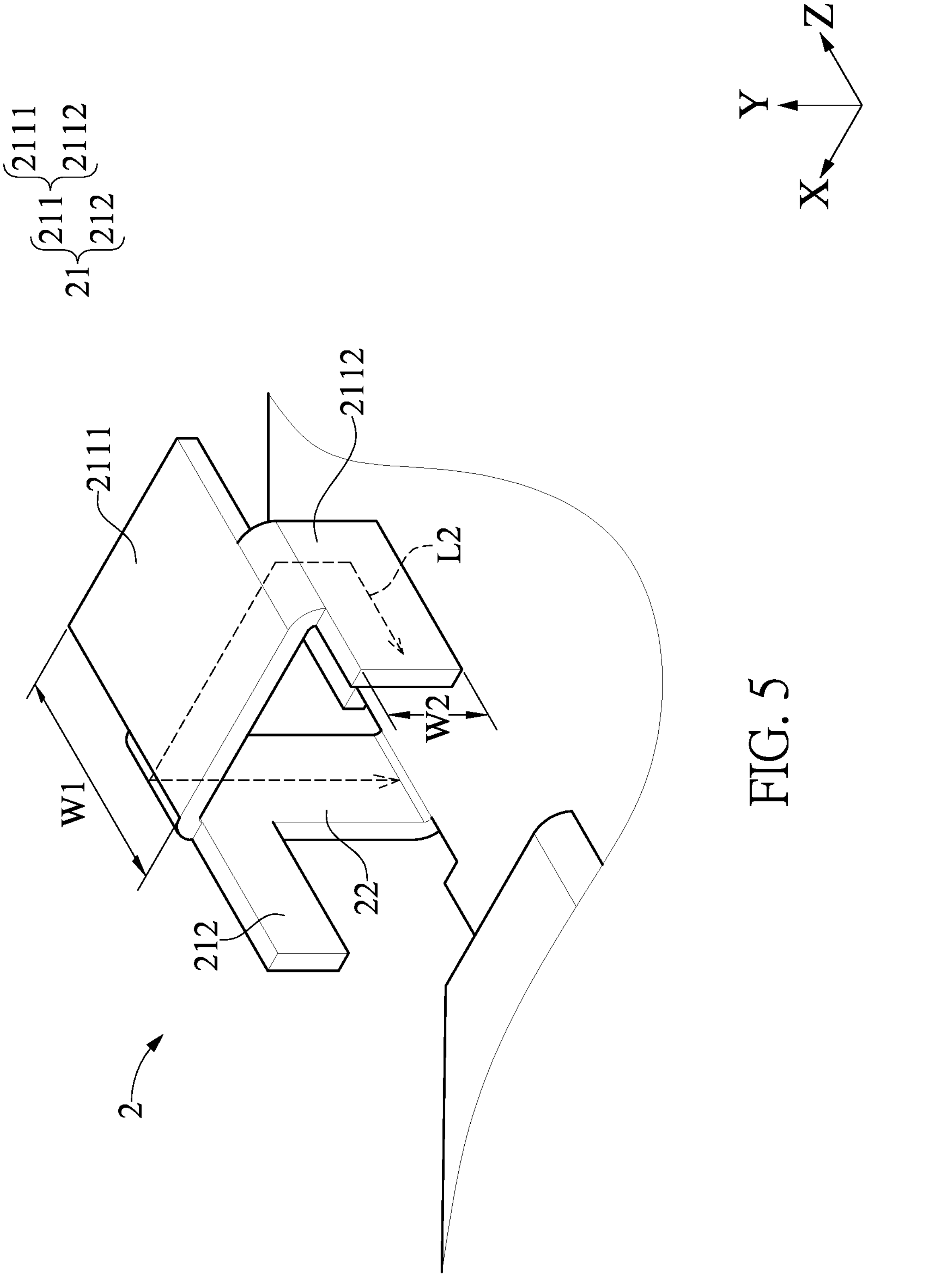
FIG. 5 is a schematic view of a second isolator of the integrated antenna structure according to the present disclosure.

Referring to FIG. 1 and FIG. 5, FIG. 5 is a schematic view of a second isolator of the integrated antenna structure according to the present disclosure. The second isolator 2 includes a second extension portion 21 and a second grounding portion 22. The second extension portion 21 includes a first branch 211 and a second branch 212 that are connected to the second grounding portion 22. The second grounding portion 22 is connected between the second extension portion 21 and the grounding element G. The first branch 211 forms a curved shape. A length of the first branch 211 is greater than a length of the second branch 212. The first branch 211 has a first section 2111 and a second section 2112. A width W1 of the first section 2111 is greater than a width W2 of the second section 2112. Furthermore, a sum L2 of the length of the first branch 211 and a length of the second grounding portion 22 is equal to one-fourth of a wavelength of 5 GHz. Accordingly, the second isolator 2 can be configured to adjust impedance matching and coupling between the third antenna element AT3 and the fifth antenna element AT5 through the structural configuration of the first branch 211 and the second branch 212 and the design in lengths of the first branch 211 and the second grounding portion 22, such that the isolation between the third antenna element AT3 and the fifth antenna element AT5 can be improved in an operating frequency band of 5 GHz.

Figure 6:
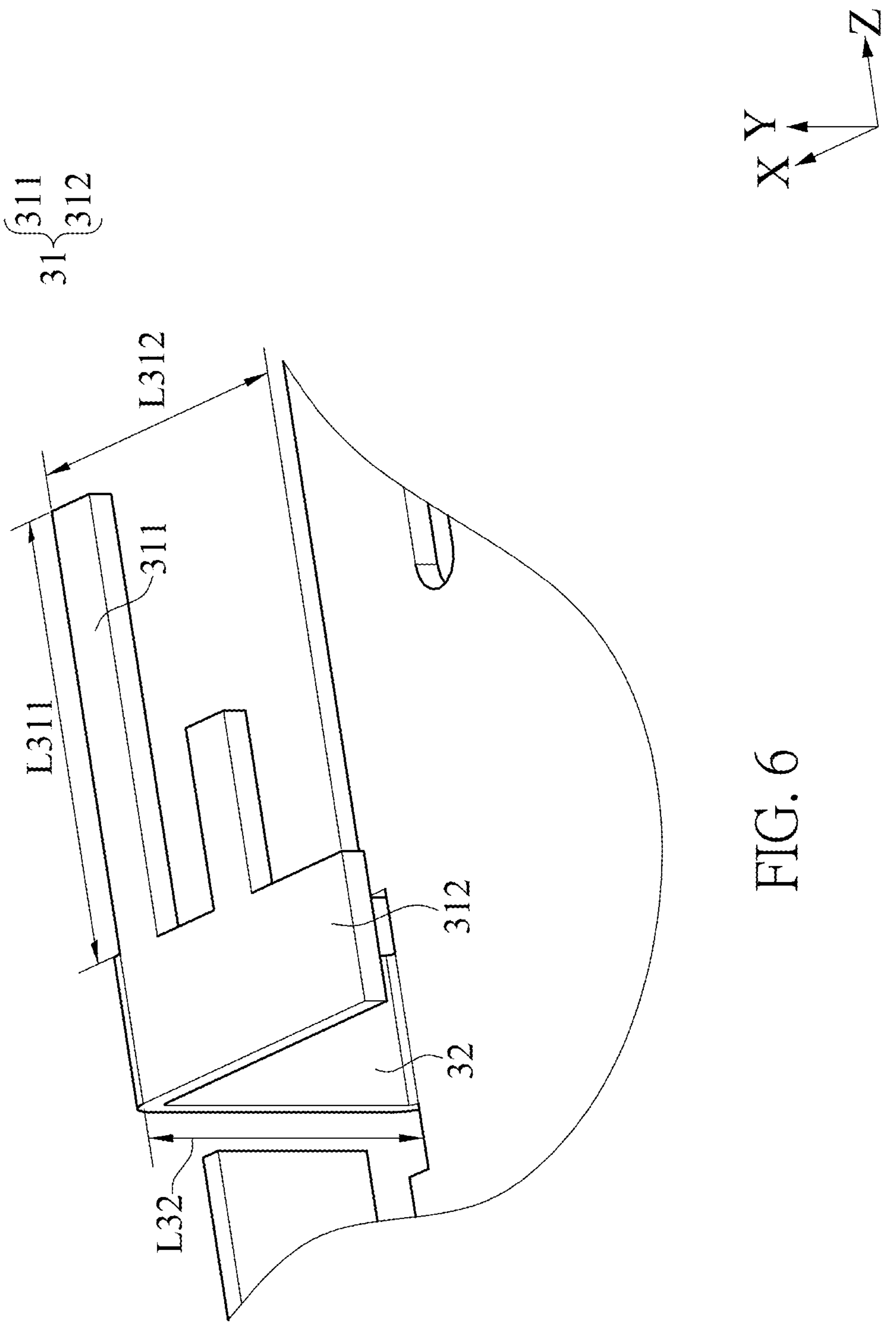
FIG. 6 is a schematic view of a third isolator of the integrated antenna structure according to the present disclosure.

Referring to FIG. 1 and FIG. 6, FIG. 6 is a schematic view of a third isolator of the integrated antenna structure according to the present disclosure. The third isolator 3 includes a third extension portion 31 and a third grounding portion 32. The third extension portion 31 includes a first branch 311 and a second branch 312. One end of the third grounding portion 32 is connected between the first branch 311 and the second branch 312, and another end of the third grounding portion 32 is connected to the grounding element G. An extending direction of the first branch 311 is perpendicular to an extending direction of the second branch 312. A length L311 of the first branch 311 is greater than a length L312 of the second branch 312. A sum of the length L311 of the first branch 311 and a length L32 of the third grounding portion 32 is equal to one-fourth of the wavelength of the 5 GHZ. A sum of the length L312 of the second branch 312 and the length L32 of the third grounding portion 32 is equal to one-fourth of a wavelength of 6 GHz.

Figure 7:
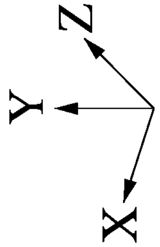
FIG. 7 is a schematic view of a fourth isolator of the integrated antenna structure according to the present disclosure.
Figure 7:
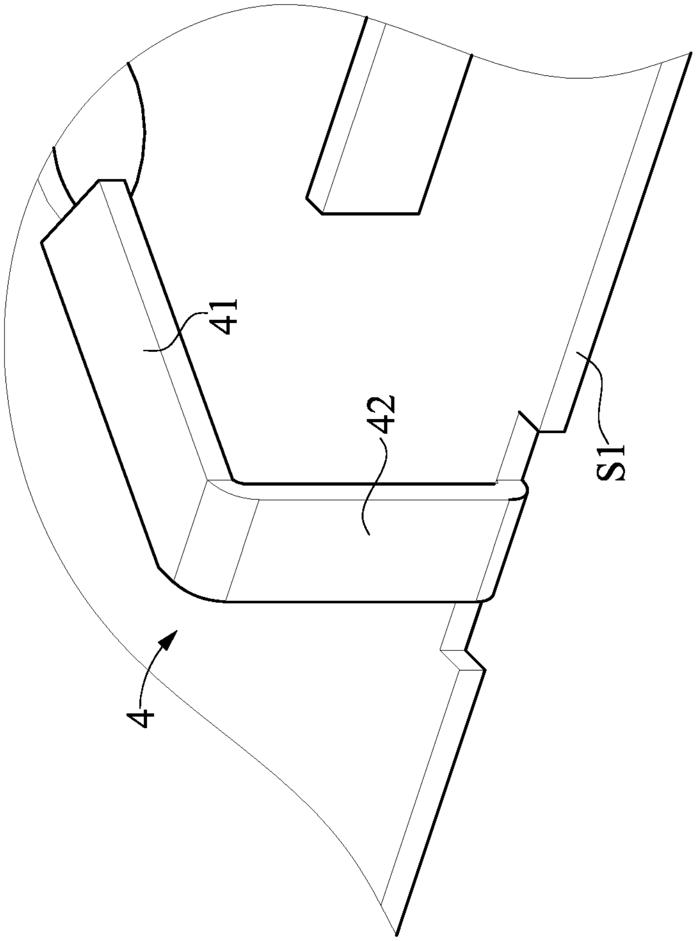

Referring to FIG. 1 and FIG. 7, FIG. 7 is a schematic view of a fourth isolator of the integrated antenna structure according to the present disclosure. The fourth isolator 4 includes a fourth extension portion 41 and a fourth grounding portion 42. The fourth grounding portion 42 is connected between the fourth extension portion 41 and the grounding element G. A length of the fourth isolator 4 (i.e., a sum of a length of the fourth extension portion 41 and a length of the fourth grounding portion 42) is equal to one-fourth of the wavelength of 5 GHz.

In addition, the fourth isolator 4 defines an axial line C that is perpendicular to a part of an edge S1 of the opening S connected with the fourth grounding portion 42. As shown in FIG. 3, an angle θ formed between the fourth extension portion 41 and the axial line C ranges from 10 degrees to 20 degrees, and preferably is 15 degrees.

Figure 8:
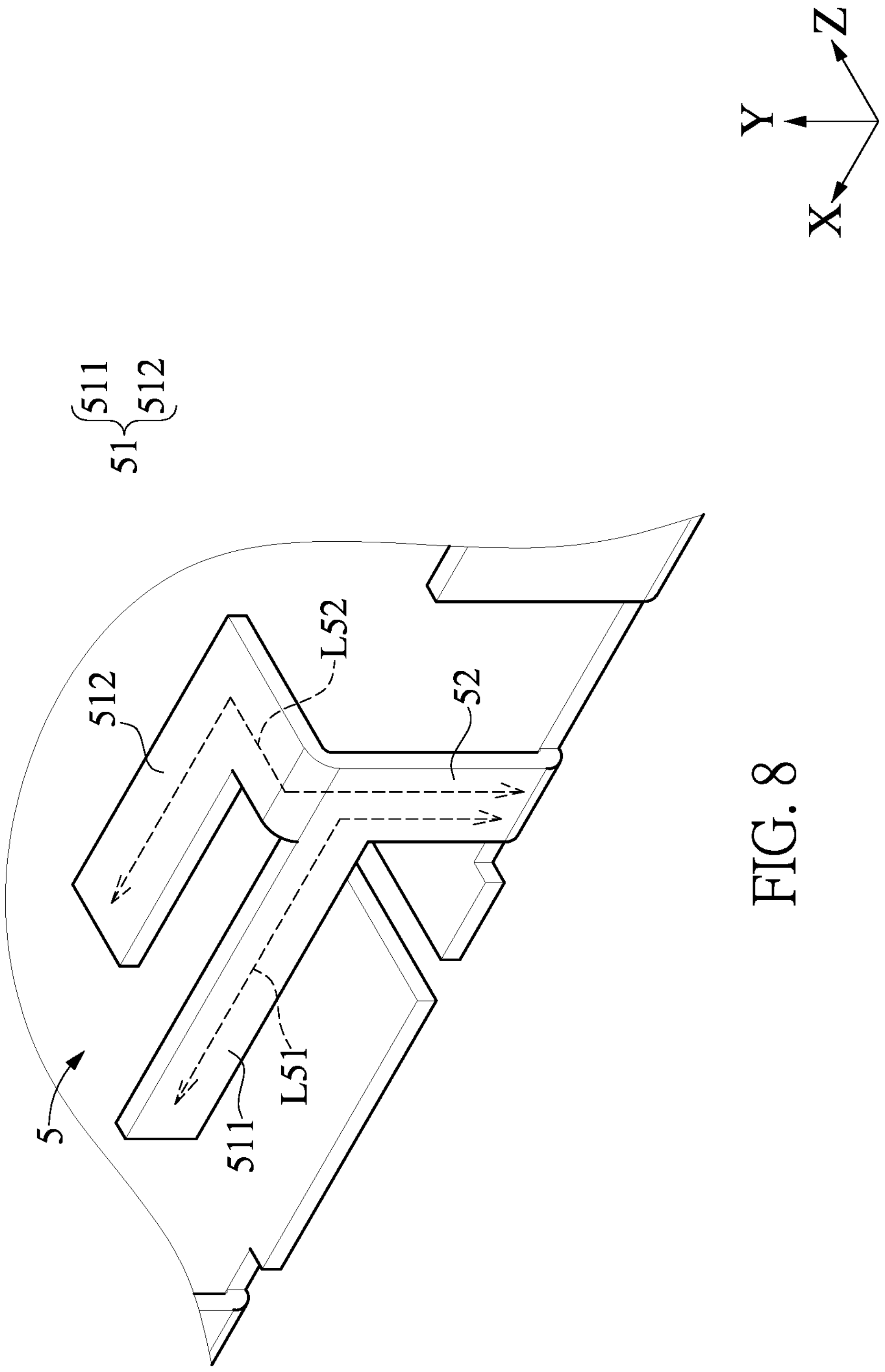
FIG. 8 is a schematic view of a fifth isolator of the integrated antenna structure according to the present disclosure.

Referring to FIG. 1 and FIG. 8, FIG. 8 is a schematic view of a fifth isolator of the integrated antenna structure according to the present disclosure. The fifth isolator 5 includes a fifth extension portion 51 and a fifth grounding portion 52. The fifth extension portion 51 includes a first branch 511 and a second branch 512. One end of the fifth grounding portion 52 is connected between the first branch 511 and the second branch 512, and another end of the fifth grounding portion 52 is connected to the grounding element G. An extending direction of the first branch 511 is parallel to an extending direction of the second branch 512. The second branch 512 forms a curved shape. A length of the first branch 511 is greater than a length of the second branch 512. A sum L51 of the length of the first branch 511 and a length of the fifth grounding portion 52 is equal to one-fourth of the wavelength of 5 GHZ, and A sum L52 of the length of the second branch 512 and the length of the fifth grounding portion 52 is equal to one-fourth of the wavelength of 6 GHz.

Accordingly, the third isolator 3, the fourth isolator 4, and the fifth isolator 5 can be configured to adjust impedance matching and coupling between the first antenna element AT1, the third antenna element AT3, the fifth antenna element AT5, and the sixth antenna element AT6 through the structural configuration and the design in lengths of the third isolator 3, the fourth isolator 4, and the fifth isolator 5, such that the isolations between the first antenna element AT1, the third antenna element AT3, the fifth antenna element AT5, and the sixth antenna element AT6 can be improved in operating frequencies bands of 5 GHz and 6 GHz.

Figure 9:
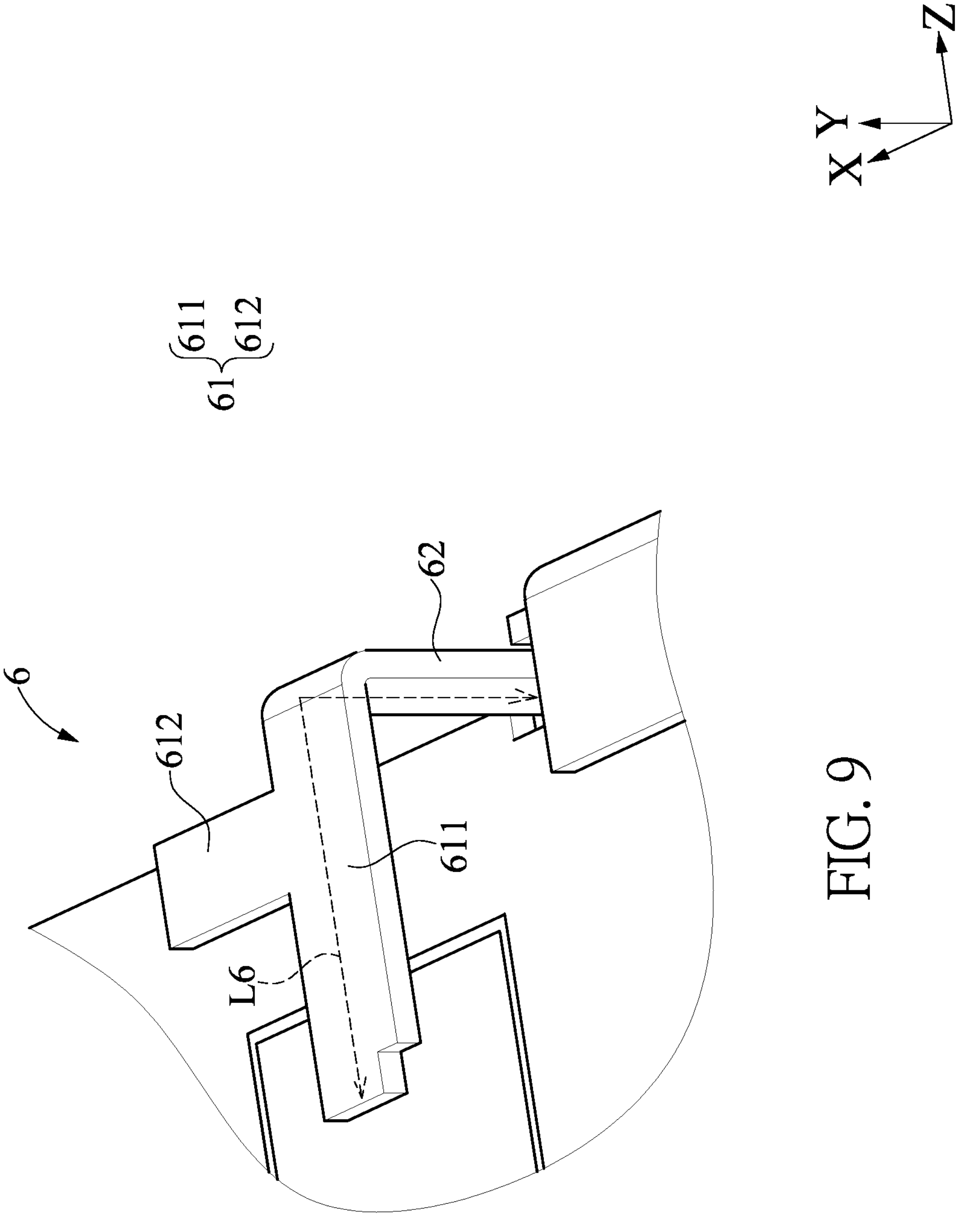
FIG. 9 is a schematic view of a sixth isolator of the integrated antenna structure according to the present disclosure.
Figure 10:
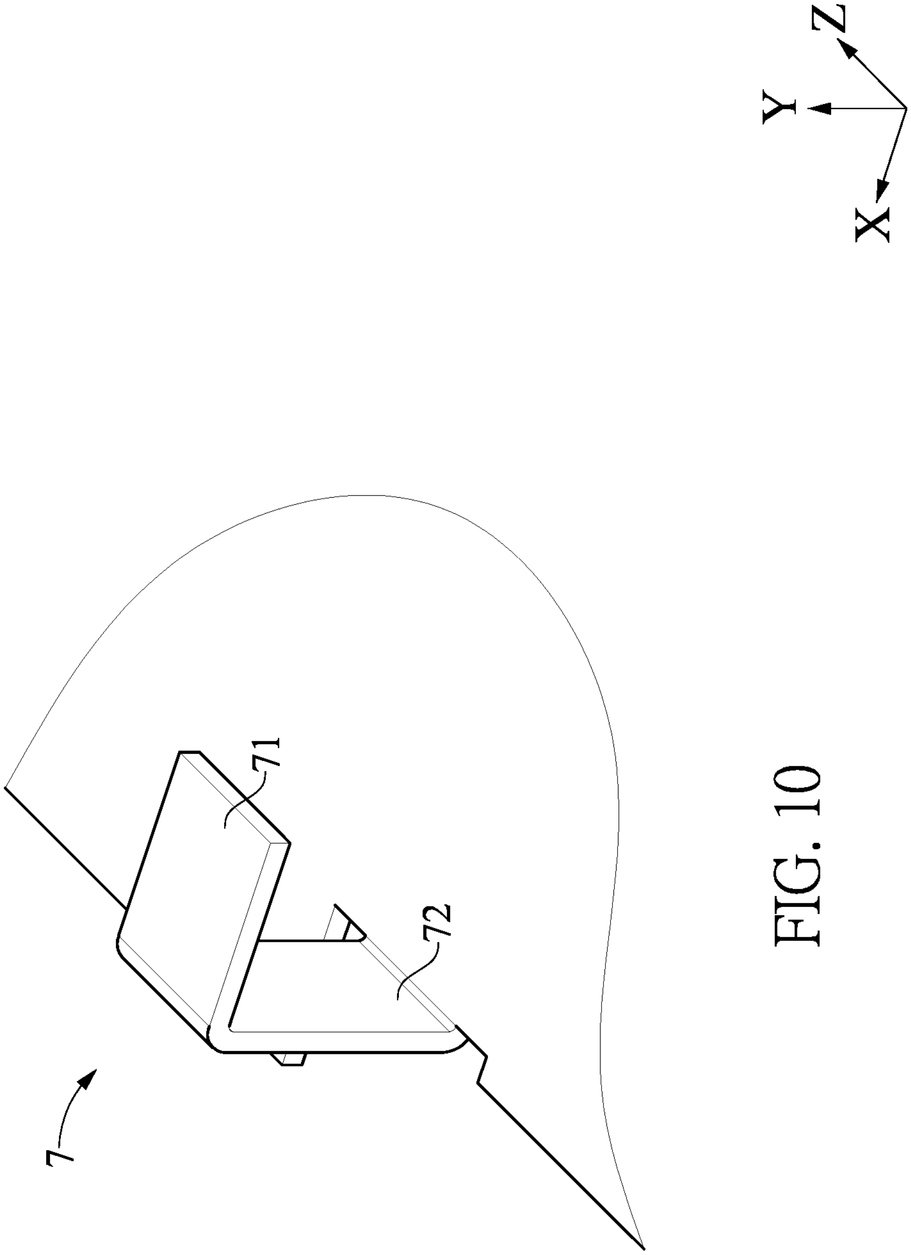
FIG. 10 is a schematic view of a seventh isolator of the integrated antenna structure according to the present disclosure.

Referring to FIG. 1 and FIG. 9, FIG. 9 is a schematic view of a sixth isolator of the integrated antenna structure according to the present disclosure. The sixth isolator 6 includes a sixth extension portion 61 and a sixth grounding portion 62. The sixth extension portion 61 includes a first branch 611 and a second branch 612. A length of the first branch 611 is greater than a length of the second branch 612. The second branch 612 is perpendicular to the first branch 611. The sixth grounding portion 62 is connected between the first branch 611 and the grounding element G. A sum L6 of the length of the first branch 611 and a length of the sixth grounding portion 62 is equal to one-fourth of the wavelength of 6 GHz. Accordingly, the sixth isolator 6 can be configured to adjust impedance matching and coupling between the sixth antenna element AT6 and the seventh antenna element AT7 through the structural configuration of the first branch 611 and the second branch 612 and the design in lengths of the first branch 611 and the second grounding portion 62, such that the isolation between the sixth antenna element AT6 and the seventh antenna element AT7 can be improved in the operating frequency band of 5 GHz.

Figure 11:
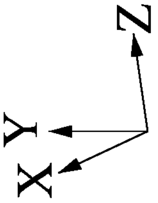
FIG. 11 is a schematic view of an eighth isolator of the integrated antenna structure according to the present disclosure.
Figure 11:
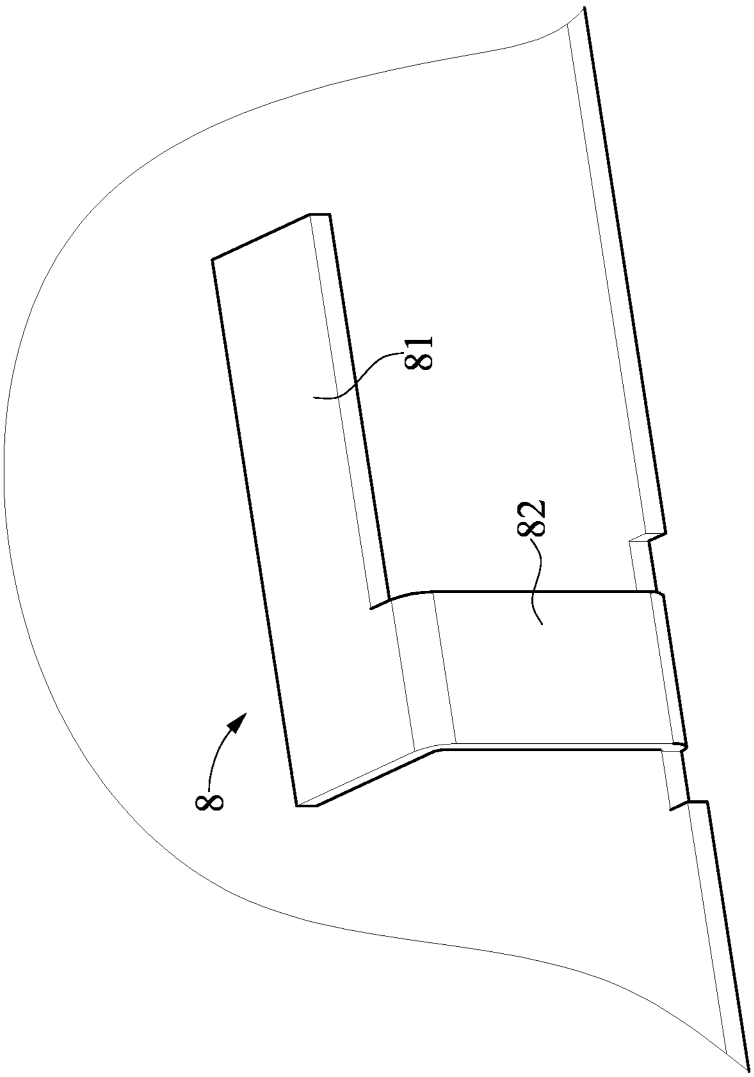
Figure 12:
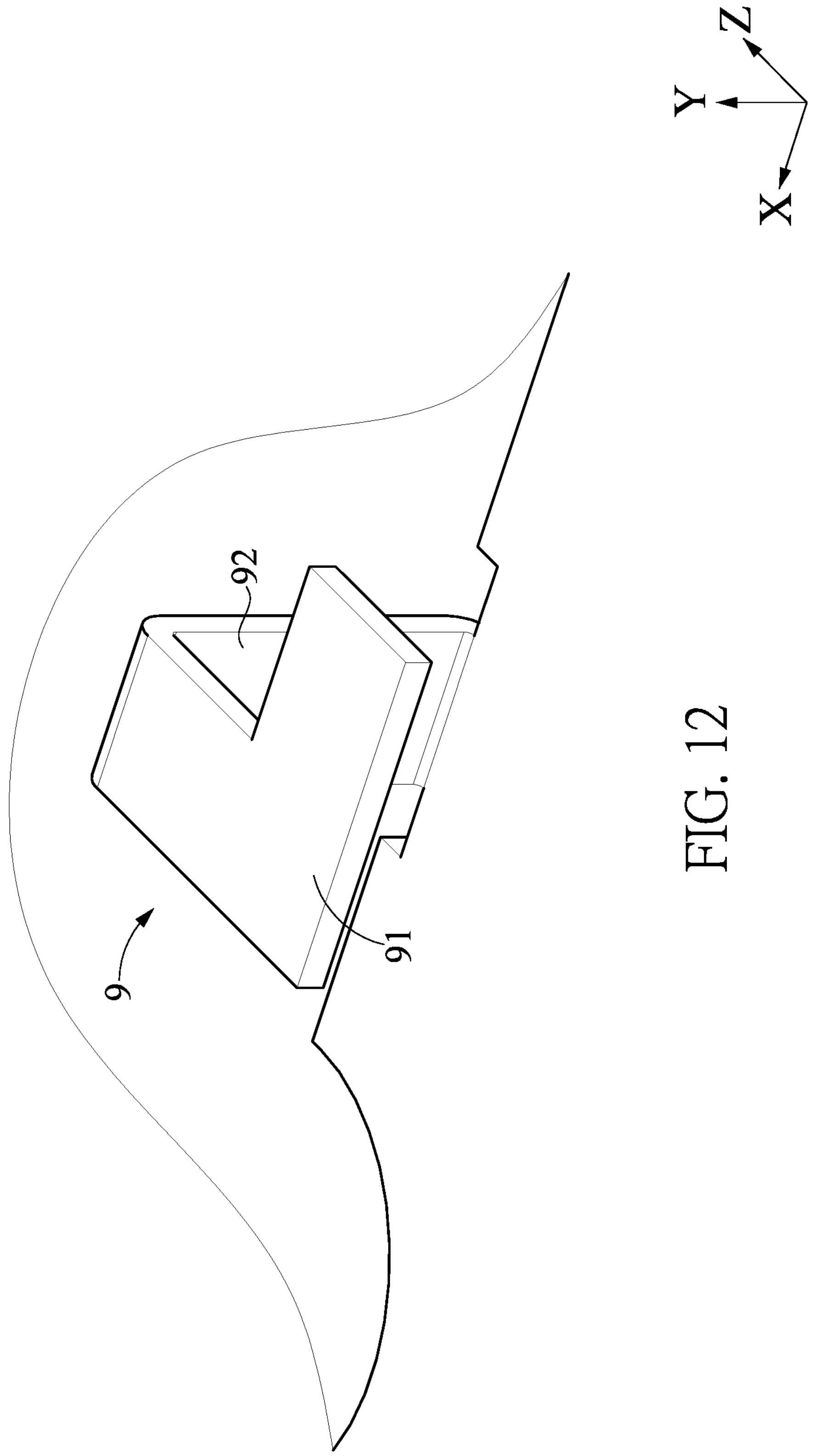
FIG. 12 is a schematic view of a ninth isolator of the integrated antenna structure according to the present disclosure.

Referring to FIG. 1 and FIG. 10 to FIG. 12, FIG. 10 is a schematic view of a seventh isolator of the integrated antenna structure according to the present disclosure, FIG. 11 is a schematic view of an eighth isolator of the integrated antenna structure according to the present disclosure, and FIG. 12 is a schematic view of a ninth isolator of the integrated antenna structure according to the present disclosure. The seventh isolator 7 includes a seventh extension portion 71 and a seventh grounding portion 72. A length of the seventh isolator 7 is equal to one-fourth of the wavelength of 6 GHz. The eighth isolator 8 includes an eighth extension portion 81 and an eighth grounding portion 82. A length of the eighth isolator 8 is equal to one-fourth of the wavelength of 5 GHz. The ninth isolator 9 includes a ninth extension portion 91 and a ninth grounding portion 92. The ninth extension portion 91 forms a curved shape. A length of the ninth isolator 9 (i.e., a sum of a length of the ninth extension portion 91 and a length of the ninth grounding portion 92) is equal to one-fourth of the wavelength of 5 GHz.

Accordingly, the seventh isolator 7 can be configured to adjust impedance matching and coupling between the seventh antenna element AT7 and the eighth antenna element AT8, such that the isolation between the seventh antenna element AT7 and the eighth antenna element AT8 can be improved in an operating frequency band of 6 GHz. The eighth isolator 8 can be configured to adjust impedance matching and coupling between the fourth antenna element AT4 and the eighth antenna element AT8, such that the isolation between the fourth antenna element AT4 and the eighth antenna element AT8 can be improved in the operating frequency band of 5 GHz. The ninth isolator 9 can be configured to adjust impedance matching and coupling between the fourth antenna element AT4 and the second antenna element AT2, such that the isolation between the fourth antenna element AT4 and the second antenna element AT2 can be improved in the operating frequency band of 5 GHZ.

Beneficial Effects of the Embodiment

In conclusion, in the integrated antenna structure M provided by the present disclosure, by virtue of "the plurality of antenna elements being disposed at an outer edge of the grounding element G and an edge of the opening S, and the plurality of isolators being located between the plurality of antenna elements," the overall size of the integrated antenna structure M can be reduced (80 mm in length, 80 mm in width, and 5.4 mm in height), while a quantity of antennas in the integrated antenna structure M can be maintained at eight and the isolation between two adjacent antennas can be maintained at −20 dB or less. In this way, the isolations between the multiple antennas in the integrated antenna structure M can be effectively improved in the low frequency and high frequency bands, and characteristics of good radiation and miniaturization of the integrated antenna structure M can be maintained.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An integrated antenna structure, comprising:

a grounding element having an opening;

a plurality of antenna elements disposed at an outer edge of the grounding element and an edge of the opening, wherein the plurality of antenna elements include a first antenna element, a second antenna element, a third antenna element, a fourth antenna element, a fifth antenna element, a sixth antenna element, a seventh antenna element, and an eighth antenna element, and wherein the first antenna element and the second antenna element are configured for generating frequency bands ranging from 2.4 GHz to 2.5 GHz and from 5.15 GHz to 5.85 GHZ, the third antenna element and the fourth antenna element are configured for generating a frequency band ranging from 5.15 GHz to 5.85 GHz, and the fifth antenna element, the sixth antenna element, the seventh antenna element, and the eighth antenna element are configured for generating a frequency band ranging from 5.925 GHz to 7.125 GHz; and a plurality of isolators disposed at the outer edge of the grounding element and the edge of the opening, and located between the plurality of antenna elements;

wherein orthogonal projections of the plurality of antenna elements and the plurality of isolators completely overlap with the grounding element.

2. The integrated antenna structure according to claim 1, wherein a height of the integrated antenna structure is smaller than or equal to 5.4 mm.

3. The integrated antenna structure according to claim 1, wherein the plurality of isolators include a first isolator, a second isolator, a third isolator, a fourth isolator, a fifth isolator, a sixth isolator, a seventh isolator, an eighth isolator, and a ninth isolator, and wherein the first isolator is located between the first antenna element and the second antenna element, the second isolator is located between the third antenna element and the fifth antenna element, the third isolator, the fourth isolator, and the fifth isolator are located between the first antenna element, the third antenna element, the fifth antenna element, and the sixth antenna element, the sixth isolator is located between the sixth antenna element and the seventh antenna element, the seventh isolator is located between the seventh antenna element and the eighth antenna element, the eighth isolator is located between the fourth antenna element and the eighth antenna element, and the ninth isolator is located between the second antenna element and the fourth antenna element.

4. The integrated antenna structure according to claim 3, wherein the first isolator includes a first extension portion and a first grounding portion, the first extension portion includes a first branch and a second branch, the first grounding portion is connected between the first branch and the second branch, the first branch forms a curved shape, a length of the first branch is greater than a length of the second branch, and a sum of the length of the first branch and a length of the first grounding portion is equal to one-fourth of a wavelength of 2.4 GHz.

5. The integrated antenna structure according to claim 3, wherein the second isolator includes a second extension portion and a second grounding portion, the second extension portion includes a first branch and a second branch, the first branch and the second branch are connected to the second grounding portion, the first branch forms a curved shape, a length of the first branch is greater than a length of the second branch, the first branch has a first section and a second section, a width of the first section is greater than a width of the second section, and a sum of the length of the first branch and a length of the second grounding portion is equal to one-fourth of a wavelength of 5 GHz.

6. The integrated antenna structure according to claim 3, wherein the third isolator includes a third extension portion and a third grounding portion, the third extension portion includes a first branch and a second branch, the third grounding portion is connected between the first branch and the second branch, an extending direction of the first branch is perpendicular to an extending direction of the second branch, and a length of the first branch is greater than a length of the second branch.

7. The integrated antenna structure according to claim 6, wherein a sum of the length of the first branch and a length of the third grounding portion is equal to one-fourth of a wavelength of 5 GHz, and a sum of the length of the second branch and the length of the third grounding portion is equal to one-fourth of a wavelength of 6 GHz.

8. The integrated antenna structure according to claim 3, wherein a length of the fourth isolator is equal to one-fourth of a wavelength of 5 GHz, the fourth isolator includes a fourth extension portion and a fourth grounding portion, the fourth isolator defines an axial line that is perpendicular to a part of the edge of the opening connected with the fourth grounding portion, and wherein an angle is formed between the fourth extension portion and the axial line, and the angle ranges from 10 degrees and 20 degrees.

9. The integrated antenna structure according to claim 3, wherein the fifth isolator includes a fifth extension portion and a fifth grounding portion, the fifth extension portion includes a first branch and a second branch, the fifth grounding portion is connected between the first branch and the second branch, an extending direction of the first branch is parallel to an extending direction of the second branch, the second branch forms a curved shape, and a length of the first branch is greater than a length of the second branch.

10. The integrated antenna structure according to claim 9, wherein a sum of the length of the first branch and a length of the fifth grounding portion is equal to one-fourth of a wavelength of 5 GHz, a sum of the length of the second branch and the length of the fifth grounding portion is equal to one-fourth of a wavelength of 6 GHz.

11. The integrated antenna structure according to claim 5, wherein the sixth isolator includes a sixth extension portion and a sixth grounding portion, the sixth extension portion includes a first branch and a second branch, the second branch is perpendicular to the first branch, the sixth grounding portion is connected to the first branch, and a sum of a length of the first branch and a length of the sixth grounding portion is equal to one-fourth of a wavelength of 6 GHz.

12. The integrated antenna structure according to claim 3, wherein a length of the seventh isolator is equal to one-fourth of a wavelength of 6 GHz.

13. The integrated antenna structure according to claim 3, wherein a length of the eighth isolator is equal to one-fourth of a wavelength of 5 GHz.

14. The integrated antenna structure according to claim 3, wherein a length of the ninth isolator is equal to one-fourth of a wavelength of 5 GHz.

* * * * *